United States Patent [19]
De Nora et al.

[11] 3,923,614
[45] Dec. 2, 1975

[54] METHOD OF CONVERTING MERCURY CATHODE CHLOR-ALKALI ELECTROLYSIS CELLS INTO DIAPHRAGM CELLS AND CELLS PRODUCED THEREBY

[75] Inventors: Vittorio De Nora, Nassau, Bahamas; Oronzio De Nora, Milan, Italy

[73] Assignee: Oronzio de Nora Implanti Electrochimici S.p.A., Milan, Italy

[22] Filed: Apr. 1, 1974

[21] Appl. No.: 456,646

[52] U.S. Cl. .................. 204/99; 204/128; 204/129; 204/250; 204/257
[51] Int. Cl.² ..... C25B 1/36; C25B 1/26; C25B 9/00
[58] Field of Search .......... 204/250, 266, 219, 256, 204/257, 258, 263, 99, 128, 129

[56] References Cited
UNITED STATES PATENTS

| | | | |
|---|---|---|---|
| 903,951 | 11/1908 | Billiter | 204/266 |
| 1,741,290 | 12/1929 | DuPire | 204/266 |
| 2,011,171 | 8/1935 | Baker | 204/266 |

FOREIGN PATENTS OR APPLICATIONS

| | | | |
|---|---|---|---|
| 73,526 | 7/1917 | Austria | 204/251 |

Primary Examiner—R. L. Andrews
Attorney, Agent, or Firm—Hammond & Littell

[57] ABSTRACT

Describes a method for converting mercury cathode chlor-alkali electrolysis cells into diaphragm cells, in place, in a mercury cell plant, the method for converting a mercury cell plant into a diaphragm cell plant while continuing operation of the plant and new diaphragm cells produced.

21 Claims, 8 Drawing Figures

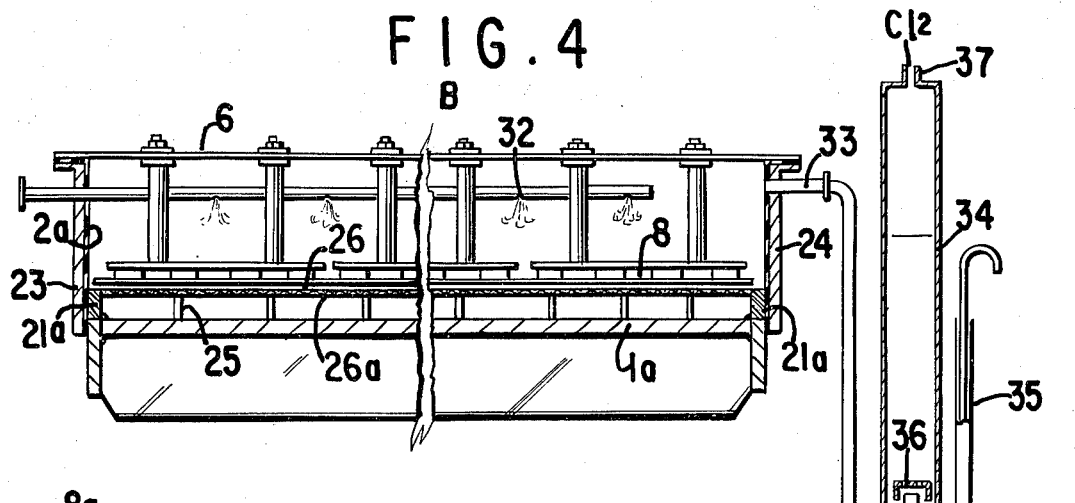
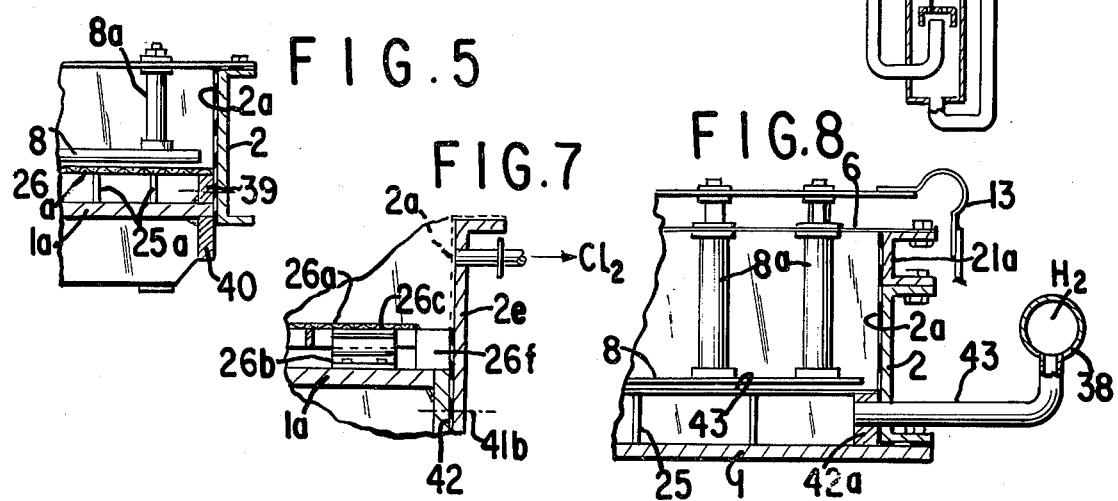
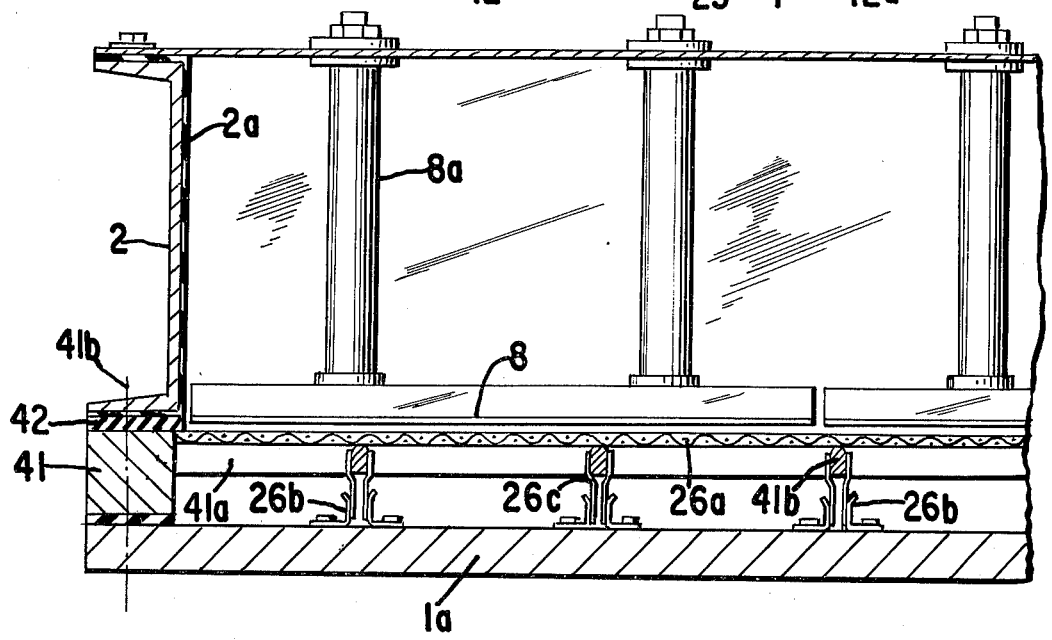

METHOD OF CONVERTING MERCURY CATHODE CHLOR-ALKALI ELECTROLYSIS CELLS INTO DIAPHRAGM CELLS AND CELLS PRODUCED THEREBY

This invention relates to a new type of electrolysis cell for the production of chlorine and other halides from sodium chlorides and similar brines with the concurrent production of the corresponding alkali metal hydroxides and to a method of producing said cell, and of converting a chlor-alkali mercury cathode electrolysis cell plant into a diaphragm cell plant.

The new type electrolysis cell described herein can be produced by conversion of existing mercury electrolysis cells into diaphragm cells with the continued use of substantially all of the mercury plant equipment or the said new cell can be built from all new materials.

Due to the present day agitation against mercury pollution of water and air, operation of a great number of mercury cell plants for the production of chlorine and similar products must be discontinued, either by closing these plants or converting them into diaphragm cell plants which do not use mercury. This conversion as previously carried out is, however, very expensive, not only in the cost of the conversion to diaphragm cells with consequent scrapping of a great amount of the mercury cell plant equipment, but also in the loss of chlorine production while the mercury cell plants are undergoing conversion or rebuilding. It has been estimated that the cost of converting a 300 ton per day mercury cell chlor-alkali plant into a diaphragm cell plant of the same capacity at present day prices is in excess of $4,000,000. (See "Economic Aspects of Converting a Chlor-Alkali Plant from Mercury Cells to Diaphragm Cells," Paper No. 61e presented at the A I Ch E National Meeting at Houston, Texas, March 3, 1971). This invention will substantially reduce these costs.

One of the objects of this invention is to reduce the cost of converting existing mercury cell chlor-alkali plants into diaphragm cell plants.

Another object is to provide a method of converting mercury cells into diaphragm cells which will use most of the existing mercury cell structure and mercury cell plant equipment.

Another object is to provide a method for the conversion of existing mercury cell plants into diaphragm cell plants operating at high production capacity, with the maximum utilization of the existing plant structures and the minimum requirement for new materials.

Another object of the present invention is to avoid the loss of large capital investments and greatly reduce the time necessary for conversion of the existing mercury plants into diaphragm cell plants.

Another object is to provide a method of conversion of an existing mercury cell plant into a diaphragm cell plant without the necessity for complete shut down of the plant, in which each individual mercury cell can be isolated from the other operating cells while being converted into a diaphragm cell and while production proceeds in the other cells.

Another object is to provide new types of diaphragm electrolysis cells which can be used in existing mercury electrolysis cell plants or in new plants built along the lines and designs of existing mercury cell plants and known mercury cell plant construction and operating techniques.

Various other objects and advantages of this invention will become apparent as the description of this invention proceeds.

The method of the present invention permits the utilization of most of the existing structures in a mercury cell plant, such as the system of electric power rectification and distribution, the brine supply and recirculation system, the upper portion of the existing mercury cell including the anodic structures, the bottom supports of the cell, the recovery systems for chlorine, hydrogen and the alkali metal hydroxide solution and other parts remain substantially unchanged.

While specific embodiments of the invention will be described with reference to electrolysis cells for the production of chlorine and caustic soda, it will be understood that other embodiments of the principles and designs of the invention may be used within the scope of the specific embodiments described and claimed herein and that the new electrolysis cells of this invention may be used in other electrolysis processes, such as the electrolysis of lithium, sodium and potassium chlorides, bromides and iodides, for the electrolysis of other salts which undergo decomposition under electrolysis conditions, for the production of chlorates and hypochlorites, for carrying out organic oxidations and reductions and many other electrolysis processes.

In the accompanying drawings which illustrate embodiments of the electrolysis cells of this invention and of the method of construction of said cell and of converting existing chlor-alkali plants from mercury cells to diaphragm cells:

FIG. 4 is a longitudinal cross sectional view of the cell of FIG. 3, along the line 4 — 4 of FIG. 3;

FIG. 5 is a sectional view of a detail of a modified form of construction;

FIG. 6 is a detail of another modified form of construction;

FIG. 7 shows a further modified form of construction; and

FIG. 8 shows a further modification, in which the side walls of the cell are extended upwardly and the anode supports and anodes are raised within the cell walls.

Figure 1:
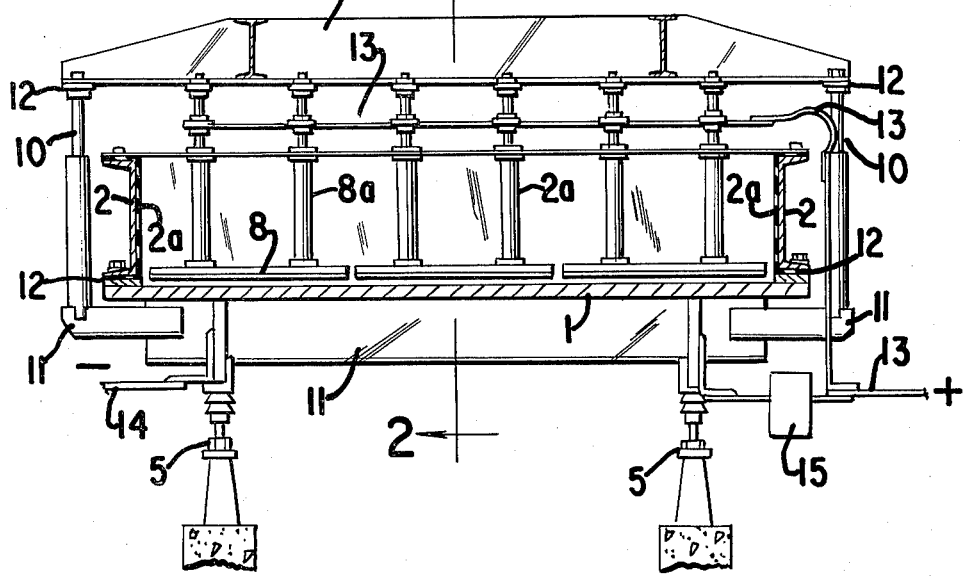
FIG. 1 is a transverse cross sectional view of a typical mercury cathode electrolysis cell as now used for the electrolysis of alkali metal salts.
Figure 2:
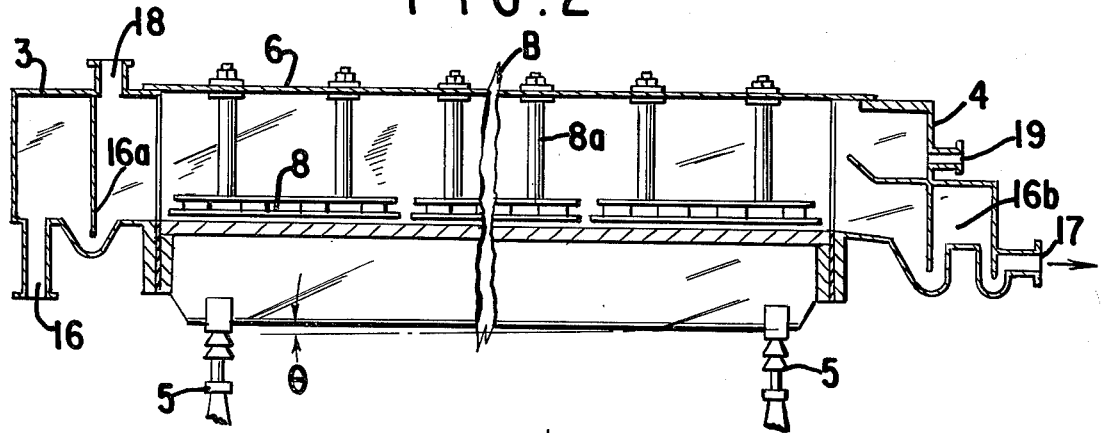
FIG. 2 is a partial longitudinal section of the cell of FIG. 1, along the line 2 — 2 of FIG. 1.

FIGS. 1 and 2 show a typical mercury cathode cell for the electrolysis of alkali metal salts comprising an elongated rectangular trough having a steel bottom 1, steel side walls 2 provided with an ebonite or other insulating, non-corrosive layer 2a on their internal surfaces, providing the anode compartment. A mercury inlet head 3 and a mercury amalgam outlet head 4 is provided at each end of the cell. Mercury flows along the bottom 1 of the cell from the inlet head 3 to the outlet 4, providing the cathode compartment. The cell is supported on insulating adjustable legs 5 which permit the cell to be inclined a small degree from the horizontal from the inlet to the outlet end. The length of these cells is usually several times the width, as indicated by the broken lines B in FIG. 2, as, for example, a width of one meter and a length of 17 meters.

The cover 6 of the cell trough may be a steel plate provided with an ebonite or other insulating, non-corrosive surface on the side exposed to the inside of the cell, or the cover 6 may be a flexible sheet of rubber, neoprene or other insulating material as described in U.S. Pat. No. 2,958,635, which also shows other details of construction of a typical mercury cathode electrolysis cell.

A number of substantially flat anodes 8 are suspended above the bottom of the cell on adjustable anode supports or lead-ins 8a and are spaced from the mercury flowing along the cell bottom 1 to provide an interelectrodic gap of approximately 2.5 to 6 mm in which the brine is electrolyzed. The anodes 8 may be graphite or dimensionally stable anodes comprising a film forming metal base structure, such as titanium or tantalum provided with a coating of a conducting electrocatalytic material on their active surfaces, such as a coating of a platinum group metal or a coating containing a platinum group metal oxide or mixtures thereof.

The anodic structures may be supported by the cover of the cell itself, if the cover is of rigid material, or, as shown in FIG. 1, they may be supported by beams 9 which rest on adjustable legs 10 rigidly connected to the bottom of the cell, by means of supports 11 or by other means. The beams 9 may be used to lift the entire anode structure out of the cell trough for adjustment, repair or replacement. Insulation 12 prevents short circuiting between the anodic assembly and the bottom of the cell on which the mercury cathode flows, and between the adjustable legs 10 and anode support beams 9. Electric current is fed to the cell by copper bus bars 13 which distribute the current to the several anodes 8 suspended above the cell bottom. Copper bus bars 14 connected to the bottom of the cell complete the electric connections to the individual cell. Normally, a number of cells are connected in series, and switches 15 permit a cell of the series to be shorted out of the circuit whenever this is necessary without interfering with the operation of the other cells of the series. Mercury is fed to the inlet nozzles 16 and flows under a dam 16a and over the inclined bottom of the cell from the inlet end 3 to the outlet end 4 and the alkali metal amalgam formed in the cell is discharged through nozzle 17 of the outlet head 4 after flowing under the dams 16b. Fresh brine is introduced into the cell through a nozzle 18 in the inlet head 3 and chlorine produced at the anodes flows out of the cell through the same nozzle 18, bubbling through the brine solution. The brine may be introduced and the chlorine removed in other ways. Spent brine flows out of the cell through nozzle 19 of the outlet cell head 4, and is recycled through the brine resaturation plant. The outlet 19 is located so as to maintain the desired brine level in the cell. All this prior art construction is more fully described in said U.S. Pat. No. 2,958,635.

Figure 3:
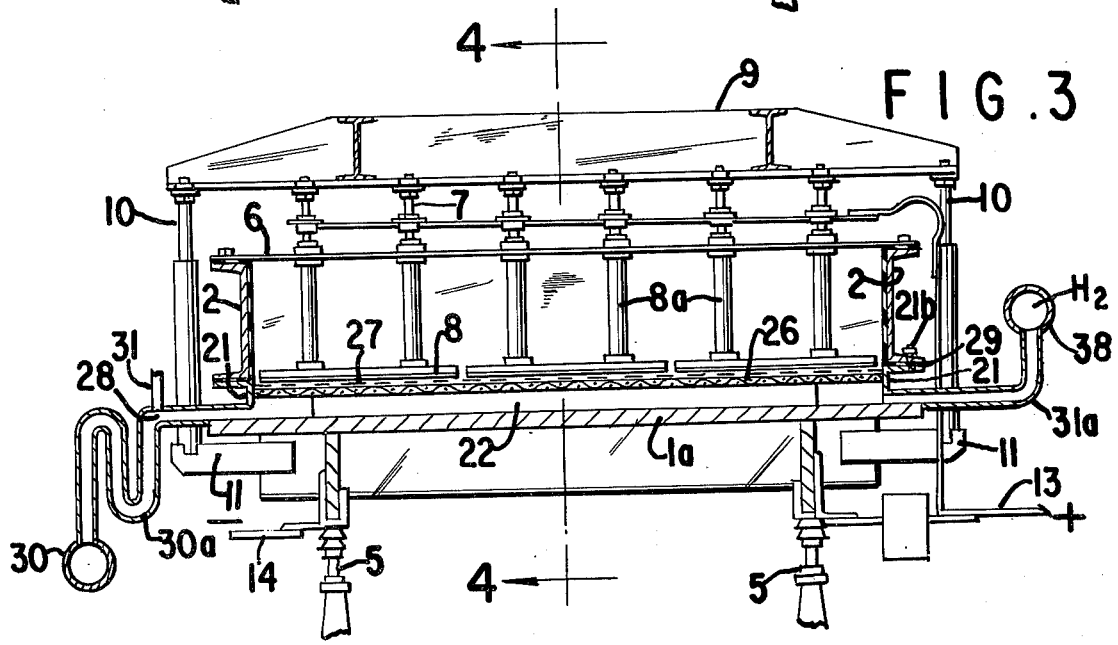
FIG. 3 is a transverse cross sectional view of the cell illustrated in FIGS. 1 and 2, modified to operate as a diaphragm cell.

The remaining figures of the drawings, particularly FIGS. 3 and 4, illustrate the application of our invention to existing mercury cathode electrolysis cells, to the new type of cell produced and to the method of converting existing mercury cathode electrolysis cell plants into diaphragm cell plants.

In one method of converting an existing mercury cathode electrolysis cell to a diaphragm cell, the bottom plate 1a (FIG. 3) is separated from the side walls 2 and the mercury inlet head 3 and the mercury amalgam outlet head 4.

Steel extension members 21 are secured by welding or bolting to the longer sides of the cell bottom plate 1a and the extension members 21a are either welded or bolted to the shorter sides of the cell bottom plate 1a as illustrated in FIG. 4 to provide a cathode compartment of greater depth than the mercury cathode thickness of the cell of FIG. 1 and FIG. 2.

The shallow trough 22 formed in this way, has approximately the same width and length as the former cell but provides a cathode compartment of greater depth.

Steel support strips 25 are secured either by welding or bolting to the bottom of the cell 1a and a cathode screen 26 of screen wire, reticulated mesh, expanded metal or the like is welded to the support strips 25 and to the extension members 21 and 21a and a diaphragm 27, illustrated by dash lines in FIG. 3, is placed upon the cathode screen.

Side walls 2 may be secured to the extension members 21 by bolts 21b passing through corresponding holes in the flange of side walls 2 and corresponding holes in the flange of the inverted L shaped extension member 21.

The mercury inlet head 3 and mercury amalgam outlet head 4 of the cell described in FIG. 1 and FIG. 2 are replaced by steel end walls 23 and 24, provided with an ebonite or other insulating and non-corrosive material on the side exposed to the inside of the cell and bolted or otherwise secured to the ends of said walls 2 to provide a liquid tight closure of the modified cell. The contact strips 25 may run longitudinally or transversely of the cell and may be continuous or discontinuous, to permit flow of the catholyte liquor to the catholyte outlet or outlets and of the hydrogen to the hydrogen outlet, which may be either on the side or at the lower end of the converted cell. The trough 22 formed as described above, forms the catholyte liquor compartment. The brine electrolyzed between the anodes 8 and the cathode screen 26 trickles through the diaphragm 27 and into the catholyte compartment and flows out of one or more outlets 28 which may be in either the side walls or the end walls of the cathode compartment formed by the trough 22. The trough may be inclined slightly from the horizontal in either the longitudinal or transverse direction to facilitate discharge of the catholyte through the outlets 28 by adjusting the level of the legs 5. Insulating plastic strips 29 or other forms of insulating gasket material are provided between the side walls 2 and the extension members 21, to prevent short circuits between the extension members, forming the cathode compartment, and the side walls 2 and end wall, forming the anode compartment of the new cell and also to prevent leakage from the cell.

The catholyte liquor flowing through one or a plurality of outlets 28 flows into a collection pipe 30 and hydrogen or other cathode gases may be discharged through hydrogen outlets 31 which may be connected to the catholyte outlets 28 or may be discharge separate from the catholyte outlets, as illustrated at 31a, located toward the top of trough 22. In operation, the catholyte liquor trickles through the diaphragm 27, flows to the outlets 28 and is discharged from the cell as rapidly as it trickles through the diaphragm, so that the catholyte compartment at all times contains very little catholyte liquor the compartment largely containing a gaseous atmosphere of hydrogen, usually at atmospheric pressure. This speeds flow through the diaphragm and rapid discharge of catholyte liquor and gases from the catholyte compartment and creates substantially no back pressure on the diaphragm. However, if desired, the catholyte compartment may be maintained filled with catholyte and operated as a flooded compartment, by raising the level of the gooseneck 30a to the level of the diaphragm 27 which will create some back pressure on the diaphragm. The pressure of the anolyte on the diaphragm 27 may be regulated to insure proper flow through the diaphragm, as the porosity of the diaphragm decreases in use due to plugging or other causes, by adjusting the level of the catholyte liquor in the gooseneck 30a or by throttling the chlorine gas outlet to produce a back pressure, as described below.

Concentrated brine is introduced at a number of places in the anode compartment through a sparge pipe 32 and chlorine flows from outlet 33 through and into a gas separation column 34, near the bottom of this column. Column 34 contains brine, the level of which may be controlled by a telescopic discharge pipe 35. The height of the brine in column 34 can be used to control the hydrostatic pressure of the brine on the diaphragm 27, to control the flow of brine through the diaphragm. Other means for controlling the gas flow from the anode compartment may be used to create a superatmospheric pressure on the anolyte. A foraminous bubble cap 36 breaks the chlorine gas stream into smaller bubbles, making the release of the gas more uniform and preventing the gas from being discharged in slugs. Chlorine gas flows out of column 34 from outlet 37 and into the chlorine recovery system.

The hydrogen produced at the cathode is prevented by diaphragm 27 from entering the anodic compartment and preferably flows out of the cathode compartment through outlets 31a located at the uppermost side of the cathodic compartment and into a hydrogen collection pipe 38 leading to the hydrogen collection system.

Electrolysis current is distributed to the anodes 8 by positive copper bars 13 and anode lead-ins 8a. The current flows from the anodes 8 through the electrolyte to the cathode screen 26, which is electrically connected to the cell bottom 1a by the contact strips 25 and by welding to the top of the extension strips 21. The interelectrodic gap may vary between 2.5 and 6.0 mm. The current then flows through contact strips 25, side walls 21 of the cathode compartment, the bottom of the cell 1a and to the negative copper bus bars 14. Chlorine is released at the anodes 8 and sodium hydroxide is formed at the cathode screen 26.

The modification illustrated in FIG. 5 shows how the principle of the invention is applicable to a different type of existing mercury cell wherein the side walls 2 are bolted to a vertical flange welded along the lower edge of the bottom of the cell 1a. The cell bottom 1a remains within the side walls 2 and the steel strips 39 are provided along the side walls 2 to support a cathode screen 26a above the cell bottom. A diaphragm (not shown) rests upon the cathode screen. Contact strips 25a which may be continuous or discontinuous and may extend either longitudinally or transversely of the cell, extend between the cell bottom and the cathode screen 26a and are welded to both to provide current conductors from the cathode screen to the cell bottom. The cathode screen 26a is preferably also welded to the steel strips 39.

Side walls 2 which in this type of existing mercury cell were bolted to the flange 40 welded to the longer sides of steel bottom 1a can now likewise be bolted to the extension steel strips 39 to accommodate the overall increase in depth of the cell due to the addition of the cathode compartment.

FIGS. 6 and 7 illustrate a further modification in which the cathode screen 26a is welded to a removable rectangular steel frame which fits exactly the perimeter of the steel bottom 1a of the cell and which is formed by spacer members 41 along the longer sides of the bottom 1a and spacer members 26f along the shorter sides of the bottom 1a. A crossed array of steel beams 41a welded to the steel frame members 41 and 26f provides the necessary rigidity to the cathode assembly and improve the distribution of the electric current to the cathode. A cathode screen 26a is welded onto the steel support beams 41a and to the inside perimeter of the rectangular frame formed by members 41 and 26f.

Copper knife blade contacts 26c are welded to the sides of support steel beams 41a and fit into corresponding copper spring contact strips 26b bolted or otherwise secured to the cell bottom to provide a sufficient electric contact area to conduct current from the cathode screen to the bottom of the cell. To improve rigidity several steel legs may be welded to the support beams 41a to support the cathode screen at several points along the entire length of the cell.

The side walls 2 of the cell are connected to the cathodic compartment by insulated tie rods 41b (indicated diagrammatically in FIG. 6).

Rubber gaskets 42 are provided between the side walls and the rectangular frame members 41 and between rectangular frame members and the bottom of the cell to prevent leakage.

End walls 2e (FIG. 7) are secured to the ends of side walls 2 and to the bottom of the cell 1a by insulated bolts 41b (diagrammatically indicated). Rubber gaskets 42 are provided to prevent leakage from the cell and to insulate the end walls and side walls from the cathode assembly. A protective layer of ebonite 2a or other suitable material is also provided on the surface of the walls exposed to the inside of the cell to prevent corrosion.

FIG. 8 shows a further modification in which the cell bottom 1 remains bolted to the flanges at the bottom of the side walls 2, and extension strips 21a are bolted, welded or otherwise secured along the top flanges of the side walls 2, thereby extending the side walls upwardly. The anodes 8, the anode lead-ins 8a, the cell top 6 (which may be rigid or flexible), the bus bar connections 13 and the anode support beams 9 (See FIG. 1) and all the connected anode assembly are raised, so that the cell top 6 rests upon the extension strips 21a and the anodes 8 are supported above the cell bottom 1 by the height of the extensions 21a to create a cathode compartment above the cell bottom 1 substantially equal in depth to the height of the extensions 21a. Steel spacer bars 42a welded to the bottom 1 of the cell are provided along the side walls 2 and the end walls of the cell and a cathode screen 43 is welded to the spacer bars 42a which provide a rectangular frame on which the cathode screen which supports the diaphragm is welded. Contact strips 25 which may be continuous or discontinuous are secured to the cell base 1 and cathode screen 43 to provide good electrical contact between the cathode screen and cell base. The contact strips 25 may run longitudinally or transversely of the cell, depending on the slope of the base and the position of catholyte and hydrogen discharge outlets. Insulation 2a is provided along the side walls 2 and between the side walls and the cell base. An outlet 43 for hydrogen or other cathode gases is provided through the spacer bars 42a and side walls 2 along one side of the cell and outlets 28 (See FIG. 3) for catholyte liquor are provided along the other side. The embodiment of FIG. 8 permits the cell bottom and side wall assemblies to remain the same, but requires that the anode assemblies be raised and supported at a higher level in the cell trough. This modification in most conversions will be more expensive than the conversions illustrated and described in connection with FIGS. 3 to 7.

Diaphragms 27 may be provided by depositing an asbestos slurry on the cathode screens 26 and applying suction to the cathode compartment outlets as is the customary practice in diaphragm cells. However, preformed asbestos or other diaphragms in either sheet or sheets in roll form may be readily applied to the cathode screens 26 or diaphragm covered cathode screens may be prepared outside the cells and installed when the cell are ready following conversion. Any type of diaphragm such as resin impregnated asbestos, prebaked resin impregnated asbestos diaphragms, silicate containing diaphragms, permselective diaphragms, sulfonated polymers of trifluorostyrene or perfluorosulfonic acid diaphragms and asbestos diaphragms coated with, containing or impregnated with said resins and/or fluorocarbons may be used.

To convert an existing mercury cathode chlor-alkali cell plant into a diaphragm cell plant, one or more of the mercury cells are cut out of the cell circuit by means of short circuiting switches 15 or equivalent short circuiting means. The cell is then raised from its base by jacks, hoists or other elevating means and the bottom detached or removed from the side walls 2. Previously prepared extension strips 21 provided with catholyte outlets are then attached to the side walls and the cell bottom 1a provided with contact strips 25, cathode screen 26, diaphragm 27 is then placed under the side walls 2 and extension strips 21 and bolted welded or otherwise secured to the extension strips 21. New ends or end boxes provided with brine feed means and gas outlets are secured on the end or sides of the cell and the new diaphragm cell ready for operation is switched into the cell circuit and operates therein as a diaphragm cell. Other cells in the circuit are converted in the same manner from mercury cells to diaphragm cells until an entire cell room has been so converted. Meanwhile the cells which are not undergoing conversion operate either as mercury or diaphragm cells and production continues.

This method of conversion permits much of the existing plant equipment to continue to be used, whereas when mercury cells are replaced with ordinary diaphragm cells, the entire cell room must be changed and the major portion of the mercury cell plant equipment must be scrapped. For example, in such a converted plant, the rectification system, the electric circuit to and from the cells, including bus bars and other connections, the anodes, the cell covers and many other parts remain the same. Some additional heating of the brine supply may be required and the sodium hydroxide from the converted diaphragm cells will be less concentrated than from the mercury cell, but the cost of any required new equipment will be minimal as compared with the cost of converting a mercury cell plant into a diaphragm cell plant using diaphragm cells now on the market.

While we have illustrated and described certain preferred embodiments of our invention, it will be understood that modifications and changes may be made therein within the spirit of our invention and the scope of the following claims and that in any mercury cell plant conversion, changes from the specific embodiments illustrated and described will be made to adapt the conversion to a particular plant layout.

What is claimed is:

1. A diaphragm electrolysis cell converted from a mercury cell having a length several times its width having two elongated metal side walls and two shorter end walls forming a substantially horizontal elongated anode compartment, flanges extending from the bottom of the metal side walls of said anode compartment, substantially horizontal anodes in the anode compartment, a cathode compartment below the anode compartment, flanges on the top of the side walls of the cathode compartment, insulating means between the flanges of said side walls and means to detachably connect the side wall flanges of the anode compartment to the side wall flanges of the cathode compartment, end walls connecting the side walls of the anode compartment to the ends of cathode compartment, a substantially horizontal cathode screen in the cathode compartment, said anodes and cathode screen forming an interelectrodic gap therebetween, a diaphragm between the anodes and the cathode screen, means to feed electrolyte into the anode compartment, means to remove anodic gases from the anode compartment, means to remove catholyte liquor and cathodic gases from the cathode compartment, means to conduct electrolyzing current to the anodes and from the cathodes and means to insulate the anode compartment from the cathode compartment.

2. The cell of claim 1, in which adjustable means are provided in the means for removing anode gases from the anode compartment to create a superatmospheric pressure in the anode compartment to control flow of the anolyte through said diaphragm.

3. The cell of claim 2, in which the superatmospheric pressure is controlled by a liquid column of adjustable height.

4. The cell of claim 1, in which the length to width ratio is about 17:1.

5. The cell of claim 1, in which bus bars extend across the width of the cell and conduct current to the anodes in the anode compartment.

6. The cell of claim 1, in which the diaphragm is a perm-selective diaphragm.

7. The method of converting a mercury cathode electrolysis cell having a length several times its width into a diaphragm cell of substantially the same size and shape which comprises adding a cathode compartment to the bottom of the anode compartment of a mercury cathode electrolysis cell, providing a cathode screen and a diaphragm for said cathode compartment and providing means to remove catholyte liquor and cathodic gases from said cathode compartment.

8. The method of converting a mercury cathode electrolysis cell plant having a electrolysis cells of a length several times their width and having an anode compartment and a cathode compartment in each cell, into a diaphragm cell plant, having cells of substantially the same size and shape, which comprises removing a mercury cathode cell in said plant from the cell circuit, providing a cathode compartment of greater depth than the mercury cathode compartment having outlets for catholyte liquor and cathodic gas below the anode compartment in said cell, inserting a cathode screen and a diaphragm between the anode compartment and the cathode compartment and returning said cell to the cell circuit.

9. The method of claim 8, in which the cell is removed from the cell circuit by short circuiting the current around said cell.

10. The method of claim 8, in which the anode compartments, the anodes and the bus bars leading to the anodes in the former mercury cell are used in the converted diaphragm cell and the diaphragm is a permselective diaphragm.

11. The method of claim 5, wherein the mercury cell is installed in a cell room having fixed installations for brine, power supply to the anode compartments and chlorine collection and after installation of the cathode compartment connecting the cell to the fixed installations and returning the cell to the cell power circuit.

12. The method of claim 11, wherein the cathode compartment is provided by fixing side walls and support members to the floor of the mercury cathode cell, and mounting a cathode screen on said side walls, and support members, whereby to provide a space between said floor and the screen.

13. The method of converting a mercury cathode chlor-alkali electrolysis cell plant having a plurality of mercury cathode electrolysis cells with a length several times their width, each having an anode compartment with anodes therein and a cathode compartment, into a diaphragm cell plant, which comprises providing an enlarged cathode compartment of approximately the same length and width as the anode compartment of said mercury cells and of greater depth, placing a cathode screen and a diaphragm between the anode compartment and the cathode compartment of greater depth, feeding brine into the anode compartment, passing an electrolysis current through said brine between said anodes and said cathode screen, recovering anodic gases from said anode compartment and recovering cathodic gases, alkali metal hydroxide and depleted brine from said cathode compartment.

14. The method of claim 13, in which the brine is sodium chloride brine, the anodic gas produced is chlorine, the cathodic gas is hydrogen and the alkali metal hydroxide is sodium hydroxide.

15. The method of claim 13, which comprises converting said cells one at a time while the remaining cells remain in the electrolysis cell circuit and continue to produce chlorine, hydrogen and sodium hydroxide.

16. The method of producing a diaphragm cell for the electrolysis of alkali chloride brine from a mercury cell having a frame with a length several times its width, an anode compartment with anodes therein and a cell bottom, which comprises forming a cathode compartment in said mercury cell frame by providing a cathode screen of substantially the length and width of said frame substantially horizontal and substantially parallel to the cell bottom and at a distance from such bottom to leave space for the catholyte and the hydrogen formed during electrolysis, raising the anodes and the side walls of the cell a distance slightly greater than the distance of the cathode screen from the cell bottom, so that said anodes and cathode screen form an interelectrodic gap therebetween, inserting a diaphragm between said anodes and the cathode screen, providing means to feed electrolyte into the anode compartment, providing means to remove anodic gases and anolyte from the anode compartment, providing means to remove cathodic gases and catholyte from the cathode compartment, providing means to bring electrolyzing current to the anodes and to the cathodes and providing means to insulate the anodes from the cathodes.

17. The method of claim 16, in which dimensionally stable anodes, formed of a film forming metal provided with a coating of a conducting electrocatalytic material on the active surfaces thereof, are used in said cell and in which the bus bars conducting current to said anodes extend transversely of the length of said cell and across the width of said cell.

18. A horizontal diaphragm cell converted from a mercury cell and mounted on a mercury cell base, comprising an elongated rectangular metal frame having a length several times greater than its width and two side walls and two end walls, mounted on said cell base and provided with a cover thereon forming an anode compartment in the upper portion of said frame, a substantially horizontal cathode screen spaced from the base and contacting the side walls to form a cathode compartment, a diaphragm on the upper surface of the cathode screen, a plurality of substantially horizontal anodes suspended above the cathode screen on supports passing through the cover, bus bars above said anode compartment extending across the width of said frame, forming means to electrically connect the anode supports to a source of direct current, means to electrically connect the cathode screen and the cell base to the negative branch of said direct current source, means to feed electrolyte to the anode compartment, means to remove anode gas from the anode compartment, means to remove catholyte and cathodic gases from the cathode compartment, and means to insulate the anode compartment from the cathode compartment.

19. The cell of claim 18, in which the length of said cell is approximately seventeen times its width.

20. The cell of claim 18, in which the diaphragm is a perm-selective membrane.

21. A horizontal diaphragm cell converted from a mercury cell and mounted on a mercury cell base comprising an elongated rectangular metal base, two side walls and two end walls connected to the cell base and provided with a cover thereon to form the cell, said base and side walls being several times longer than said end walls, a substantially horizontal cathode screen spaced from the base and contacting the side walls to form the lower cathode compartment, a diaphragm on the upper surface of the cathode screen to form an upper anode compartment, a plurality of substantially horizontal anodes suspended above the cathode screen on supports passing through the cell cover, means extending across said cell transversely to said side walls, to electrically connect the anode supports to a source of direct current, means electrically connecting the cathode screen and the cell base, means to feed electrolyte to the anode compartment, means to remove anode gas from the anode compartment, means to remove catholyte and cathodic gases from the cathode compartment, means to impress an electric current on the cell and means to insulate the anode compartment from the cathode compartment.

* * * * *